United States Patent
Mulder

(10) Patent No.: US 8,938,910 B2
(45) Date of Patent: Jan. 27, 2015

(54) PLANTING OF PLANT MATERIAL

(75) Inventor: Jan Albert Mulder, Naaldwijk (NL)

(73) Assignee: Precision Drip, B.V., KX de Lier (NL)

( * ) Notice: Subject to any disclaimer, the term of this patent is extended or adjusted under 35 U.S.C. 154(b) by 477 days.

(21) Appl. No.: 11/918,771

(22) PCT Filed: Apr. 19, 2006

(86) PCT No.: PCT/NL2006/000203
§ 371 (c)(1),
(2), (4) Date: Oct. 18, 2007

(87) PCT Pub. No.: WO2006/112700
PCT Pub. Date: Oct. 26, 2006

(65) Prior Publication Data
US 2009/0126266 A1 May 21, 2009

(30) Foreign Application Priority Data

Apr. 19, 2005 (NL) ..................................... 1028815

(51) Int. Cl.
*A01G 9/08* (2006.01)
*A01C 7/04* (2006.01)
*A01C 11/02* (2006.01)

(52) U.S. Cl.
CPC . *A01G 9/085* (2013.01); *A01C 7/04* (2013.01); *A01C 11/02* (2013.01)
USPC .................................. 47/58.1 SE; 47/1.01 P

(58) Field of Classification Search
CPC ................................ A01G 9/08; A01G 9/081
USPC ............. 111/900, 903–905, 200; 47/58.1 SE, 47/58.1 R, 1.01 R, 1.01 P, 1.7, 57.6
IPC ............................................ A01C 11/00, 11/02
See application file for complete search history.

(56) References Cited

U.S. PATENT DOCUMENTS 3,852,913 A * 12/1974 Clendinning et al. ............ 47/74
4,020,881 A * 5/1977 Nothen .............................. 141/1

(Continued)

FOREIGN PATENT DOCUMENTS

| JP | 06-225643 | 8/1994 | |
| JP | 08089091 A * | 4/1996 | ............... A01G 9/08 |

(Continued)

OTHER PUBLICATIONS

PCT International Search Report, Jun. 6, 2006.

*Primary Examiner* — David Parsley
*Assistant Examiner* — Danielle Clerkley
(74) *Attorney, Agent, or Firm* — Nath, Goldberg & Meyer; Joshua B. Goldberg

(57) ABSTRACT

A method of treatment and seeding or planting of seeds and/or plantable material in a substrate with at least one planting position, including in any order: (a) treating the seeds and/or the plantable material with a treatment substance by depositing the treatment substance in or at the planting position with the aid of treatment depositing device; and (b) depositing the seeds and/or the plantable material at the planting position with the aid of a seed and/or plantable material depositing device; (c) displacing the substrate and at least one of the treatment depositing device and the seed and/or plantable material depositing device relative to one another; (d) providing a substrate having at least two plant positions formed independently from the process in advance thereof at a pre-defined distance in the direction of relative displacement; and (e) controlling the treatment depositing device and the seed and/or plantable material depositing device for depositing at least one specimen of the seeds and/or the plantable material and a desired amount of treatment substance for deposition thereof at the pre-defined planting positions in the substrate on the basis of at least one of the group consisting of: a depositing trajectory, a depositing time, and a speed of movement from the depositing means relative to the substrate.

18 Claims, 1 Drawing Sheet

(56) References Cited

U.S. PATENT DOCUMENTS

| | | | |
|---|---|---|---|
| 4,777,763 A * | 10/1988 | Shannon et al. | 47/74 |
| 5,254,140 A * | 10/1993 | Huang | 47/1.01 R |
| 5,260,875 A * | 11/1993 | Tofte et al. | 701/50 |
| 5,621,666 A * | 4/1997 | O'Neall et al. | 700/283 |
| 5,638,285 A * | 6/1997 | Newton | 700/241 |
| 5,685,245 A * | 11/1997 | Bassett | 111/62 |
| 5,709,271 A * | 1/1998 | Bassett | 172/4 |
| 5,837,997 A * | 11/1998 | Beck et al. | 250/227.11 |
| 5,956,255 A * | 9/1999 | Flamme | 700/244 |
| 6,039,141 A * | 3/2000 | Denny | 180/329 |
| 6,079,340 A * | 6/2000 | Flamme et al. | 111/178 |
| 6,820,367 B2 * | 11/2004 | Poirier et al. | 47/1.01 P |
| 7,270,065 B2 * | 9/2007 | Conrad | 111/200 |
| 7,273,016 B2 * | 9/2007 | Landphair et al. | 111/185 |
| 2004/0206282 A1 * | 10/2004 | Sandoval et al. | 111/52 |
| 2004/0231575 A1 | 11/2004 | Wilkerson et al. | |

FOREIGN PATENT DOCUMENTS

| | | | | |
|---|---|---|---|---|
| JP | 08089091 | | 9/1996 | |
| JP | 08-298816 | | 11/1996 | |
| JP | 09205830 A | * | 8/1997 | A01C 7/08 |
| JP | A-2-69108 | | 3/1999 | |
| JP | 2000300013 A | * | 10/2000 | A01C 7/08 |
| WO | WO 9911114 A1 | * | 3/1999 | A01G 9/08 |

* cited by examiner

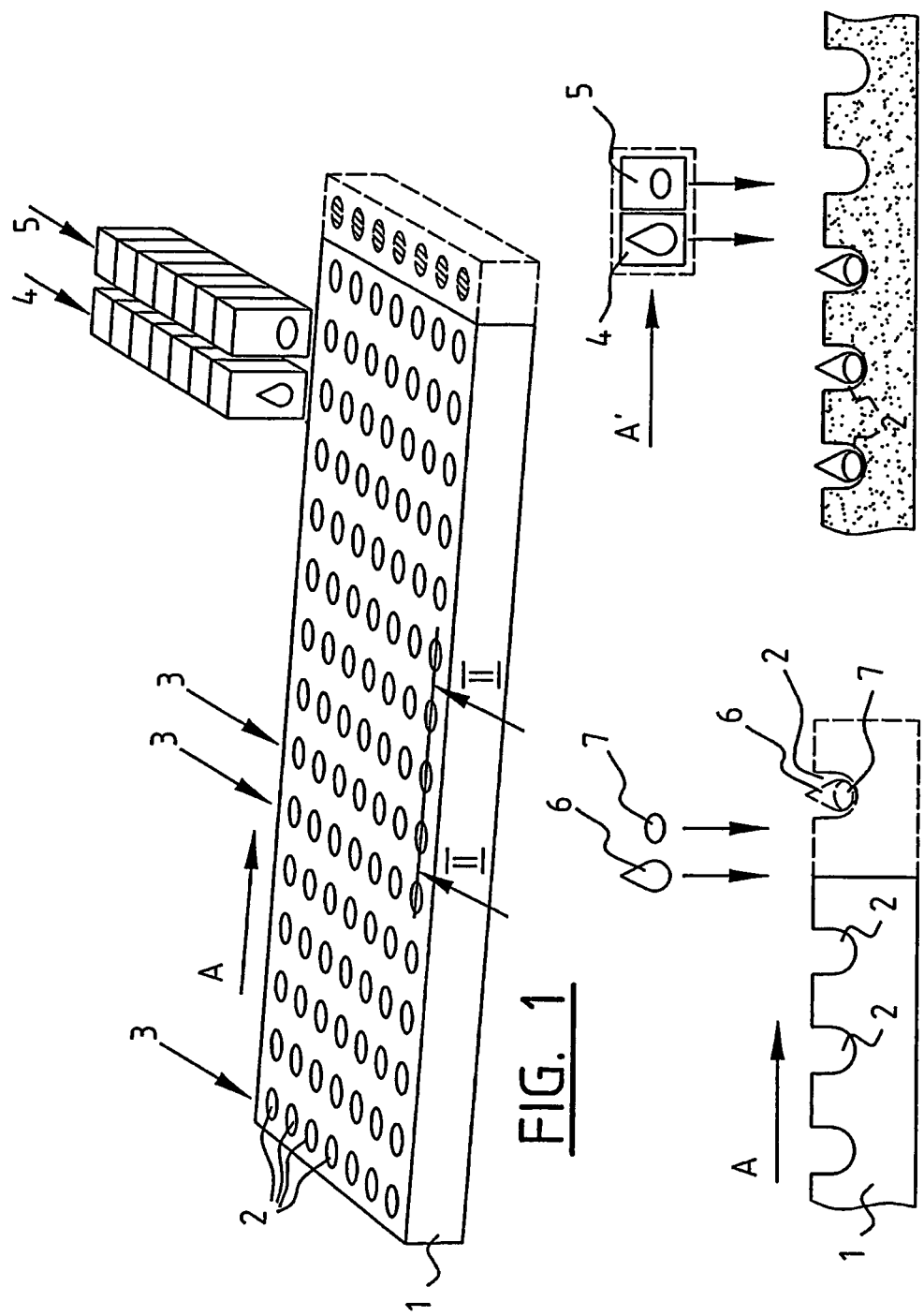

PLANTING OF PLANT MATERIAL

TECHNICAL FIELD AND BACKGROUND OF THE INVENTION

The present invention relates to a method and a device for the treatment and especially planting seed and/or plantable material, such as for instance, though not exclusively, seeds, seedlings, etc.

Such a method and device are known from e.g. US-2004/0,231,575, where seeds are deposited in a trench or furrow, and treatment substance is deposited in correspondence with a location, where individual seeds are expected to drop in the furrow.

In the technology of planting plants it is known to pretreat seeds and/or plantable material, i.e. that for planting the plantable material a treatment can be performed. Then a treatment agent, such as a fungicide, a pesticide, bacteria, etc. or a growth promoting substance, in the form of a coating can be applied on the seeds, seedlings, etc.

Alternatively it has been proposed to deposit seeds or seedlings, etc. and treatment substance separately and approximately simultaneously on a planting position in order to thereby obviate the need to apply a coating on seeds, seedlings, etc.

SUMMARY OF THE INVENTION

The present invention relates to an improvement to this last named alternative in the form of a method and a device according to respectively claim 1 and claim 9.

With a method and a device according to the present invention it is possible to realize a very fast process of seeding and/or planting wherein seeds, seedlings, etc. and separately therefrom also treatment substances can be deposited in an arbitrary sequence or simultaneously in or on the planting positions in a substrate. With certainty under such circumstances it is achieved, that the seeds or plantable material are put into the intended planting position and/or that the treatment substance is put into the envisaged planting position. In embodiments, wherein both of the seed and/or planting material and the treatment substance are to be deposited in a planting position, and wherein according to the present invention the depositing trajectory, etc., is taken into account, it is ensured that not only a specimen of the seed and/or the plantable material is deposited into at least one of the planting positions, but also a predetermined amount of treatment substance.

The present invention comprises several preferred embodiments, such as these are defined in the dependent claims 2 to 6. It is obvious, that these preferred embodiments are not limiting on the present invention. For an example claim 2 relates to the feature, that the method is performed in a continuous movement, essentially without interruptions, when displacing the depositing means and the substrate relative to one another. As such it is possible to ensure, that the speed of the process can be increased considerably, without diminishing the security, that upon each desired planting position a specimen of the seed and/or plantable material is deposited, together with a dosed or desired amount of treatment substance.

In many possible embodiments the substrate will be displaced relative to the depositing means. As such the device having depositing means can be arranged in a stationary manner and substrates can be fed there trough with the relative displacement speed to arrange therein seeds and/or plantable material and to simultaneously provide a desired amount of treatment substance at each planting position in the substrate. This, however, does not exclude, that the present method can also be performed in an open field or in the natural ground, where the substrate is interpreted as the soil.

A substrate can be a layer of fibrous material comprising for instance stone wool fibres, pot ground, cocos fibres, etc. with rows of planting positions arranged therein, where the depositing means comprise essentially corresponding rows of depositing elements. As such, at every planting position in a row, a specimen of the seed and/or the plantable material can be deposited, together with a dosed or desired amount of treatment substance. Such a substrate can for instance be made from fibrous material, known as a tray with rows of planting positions at well defined intermediate distances, which are for instance equal to the distances between the planting positions in every row. The depositing elements take care of depositing the seed and/or the plantable material and/or the treatment substance. In such an embodiment the rows can be arranged in a transversal orientation relative to the displacement direction, where the depositing elements are controlled by the control to simultaneously and in correspondence with the rows deposit numbers of specimens of the seeds and/or the plantable material and/or the dosed amounts of treatment substance. As a result at all planting positions in a row a specimen of the seeds and/or the plantable material and/or the treatment substance can be deposited and optimum use can be made of holders of a substrate, that are known as trays, such as plates of fibrous material.

It is noted, that especially in case where depositing both a specimen of the seeds and/or the plantable material as well as a desired amount of treatment substance at a planting position is desired, the control can take into account differences in the depositing trajectory, the depositing speed, etc., for different properties of the seeds and/or the plantable materials and the drop shaped, granular shaped or powder shaped treatment substance in relation to the weight or the air resistance thereof.

As already has been noted herein above, the present invention also in itself relates to a device for performing the method according to the present invention.

BRIEF DESCRIPTION OF THE DRAWINGS

Below a preferred embodiment of the present invention will be described, referring to the accompanying drawings, wherein the same or similar components and elements are designated with the same reference numbers, and wherein:

FIG. 1 shows a schematic perspective view of an embodiment of the present invention;

FIG. 2 shows a cross sectional view along the line II-II in FIG. 1; and

FIG. 3 shows the progression of the invention, in the embodiment that is schematically represented in FIG. 1 and FIG. 2.

DETAILED DESCRIPTION OF THE DRAWINGS

In FIG. 1 a tray 1 is shown. In the upper surface of the tray 1 planting positions 2 are defined, for instance in the shape of (small) depressions or pits. The tray 1 with the planting positions 2 is filled with for instance a substrate, or is manufactured from a fibrous material, such as stone wool, but additionally or alternatively use can be made of cocos fibres or potting soil. The planting positions 2 are arranged in the upper surface of the substrate 1 in rows 3 within the embodiment shown schematically in FIG. 1 seven planting positions 2 per row 3.

Further, in FIG. 1, depositing elements 4 are shown for drops of treatment substance, as well as depositing elements 5 for seeds. It is evident, that additionally or alternatively for drops of treatment substance also granular or powder shaped treatment substances can be employed, and in the place of seeds also seedlings, etc., can be planted in the substrate 1.

The substrate 1 in the form of the tray with the planting positions is advanced in the direction of arrow A relative to the depositing elements 4, 5 with transport means (not shown), where the depositing elements 4, 5 are themselves stationary and form part of a device for performing the method according to the present invention. It is noted, that also such a device, of which here only the depositing elements 4, 5 are shown in FIG. 1, can be mobile, where for instance no substrates 1 pass under the depositing elements 4, 5, but where the depositing elements 4, 5 can even be arranged on a transportable frame in order to be pulled over a agricultural field or the full soil or any other stationary ground underneath. Such a solution can also provide in making the ground underneath flat and forming therein pits in correspondence with the planting positions 2, such as those that have been shown in FIG. 1.

As shown in FIG. 2, the substrate 1 is displaced in the direction of arrow A. In the cause of this action regularly (rows of) planting positions are arranged underneath the depositing elements 4, shown in FIG. 1, for drops of treatment substance and underneath the depositing elements 5 for depositing seeds in the planting positions. The depositing elements 4, providing drops of treatment substance, and the depositing elements 5 for seeds are at some distance from one another in the direction of movement of arrow A, relative to one another. This fact is to be taken into account when it is desired, that a drop 6 and a seed 7 subsequently or simultaneously arrive at or in one of the planting positions 2. In this process also the depositing speed and the air resistance of drops 6 and seeds 7 can be taken into account, in order to drive the depositing elements 4, 5 with a control (not shown) on the basis of these differences in position and depositing properties. In the embodiment as shown first a drop 6 is deposited in a planting position 2 formed by a depression, followed by a seed 7, while it is possible under other circumstances due to legislature, etc. that it is desirable to reverse this sequence. Then first a seed 7 is deposited, followed by the drop 6, so that there is no pretreatment of the substrate 1, prior to depositing the seed.

FIG. 3 shows the situation in a reversed order, such as it has already been described herein above, where the depositing elements 4, 5 are moved in the direction of arrow A' over a ground underneath, for instance the soil of an agricultural field, where it should also be taken into account at which moment a drop of treatment substance and a seed is to be deposited in order to be brought into correspondence with one another, and so that at each planting position not only a seed 7, but also a drop of treatment substance 6, is deposited.

With the present invention a highly automated process is made available, which is very favourable in relation to costs, without requiring that precoated seeds 7, which are relative expansive, must be purchased. According to the present invention positional differences are taken into account of the depositing elements 4, 5, as well as differences in depositing properties and trajectories of the individual treatment substances in distinguishable shapes (drops, powder, granules, etc.) and the seeds and/or the plantable material, for instance seeds, seedlings, etc. By taking all these different factors into account it is possible to ensure with certainty, that at each planting position to a treatment substance is deposited in combination with seeds and/or a plantable material.

After having been confronted with the description herein above, many alternative and additional embodiments will become apparent to the skilled person. For instance it can be possible, that the depositing elements for the treatment substance or for specimens of the seeds and/or the plantable material are not exactly downward oriented. For instance a drop 6 of treatment substance can be "fired" onto a falling seed to encompass the seed 7, before the seed 7 lands in a planting position. It is also possible to combine the depositing elements 4, 5 in order to dip the seeds and/or the plantable material in treatment substance or to encompass the seed therein, just prior to depositing at least a specimen of the seeds and/or the plantable material, as long as it is ensured, that thereafter the movement in the direction of arrow A or A' is taken into account, when it comes to letting go of the specimen of the plantable material, that is thus treated with pretreatment substance, as well as the envisaged location, where this should arrive, i.e. at one of the planting positions. It can also be preferred, under certain circumstances, to first deposit the seed, followed by the treatment substance. Further alternative and additional embodiments are all considered to lie within the scope of protection of the present invention in as far as these embodiments do not diverge in letter or spirit from the definitions of the present application in accordance with the accompanying claims.

What is claimed is:

1. A method of treatment and seeding or planting of seeds and/or plantable material, comprising in any order:
   (a) providing a substrate in the form of a tray made from fibrous material having transversal rows of planting positions at well defined intermediate distances in a direction of relative displacement, said transversal rows of planting positions each having a transversal orientation relative to the direction of relative displacement;
   (b) treating the seeds and/or the plantable material with a treatment substance by depositing the treatment substance in or at the planting positions with the aid of a stationarily arranged treatment depositing device relative to a stationary ground, wherein the treatment substance is liquid; and
   (c) depositing the seeds and/or the plantable material at the planting positions with the aid of a stationarily arranged seed and/or plantable material depositing device relative to a stationary ground, wherein the seed and/or plantable material depositing device and the treatment depositing device each comprise a row of depositing elements, said row having a transversal orientation relative to the direction of relative displacement, wherein the row of depositing elements of the seed and/or plantable material depositing device and the row of depositing elements of the treatment depositing device are each configured for depositing the seeds and/or plantable material and said treatment substance, respectively, in a corresponding transversal row of planting positions, and the depositing elements of the treatment depositing device and the depositing elements of the seed and/or plantable material depositing device are at a distance from one another in said direction of relative displacement;
   (d) continuously, essentially without interruptions, displacing the substrate in the direction of relative displacement during said depositing of the seeds and/or plantable material and said depositing of the treatment substance; and
   (e) controlling the treatment depositing device and the seed and/or plantable material depositing device for depositing at least one specimen of the seeds and/or the plantable material and a desired amount of treatment substance for deposition thereof at the planting positions, on the basis of the relative distance between depositing elements of the treatment depositing device and depositing elements of the seed and/or plantable material depositing device and a speed of movement of the substrate, wherein the planting positions are in the shape of depressions or pits.

2. The method according to claim 1, wherein the depositing elements of the treatment depositing device and the seed and/or plantable material depositing device each deposit a seed and/or plantable material or treatment substance at a single respective planting position at a time.

3. The method according to claim 1 wherein the treatment substance is chosen from the group consisting of: a fungicide, a pesticide, a plant growth promoting substance, and a bacteria.

4. The method according to claim 1, wherein the seeds and/or the plantable material is chosen from the group consisting of seeds and seedlings.

5. The method according to claim 1, wherein the depositing elements of the treatment depositing device and the depositing elements of the seed and/or plantable material depositing device are driven by a control to subsequently or simultaneously deposit a number of seeds and/or plantable material and a desired amount of treatment substance in correspondence with the number of planting positions in each of the rows.

6. The method of claim 1, wherein the fibrous material is stone wool fibers, pot soil or cocos fibers.

7. The method according to claim 1, wherein the treatment substance is chosen from the group consisting of: a fungicide and a pesticide.

8. The method according to claim 1, wherein the depositing elements of the treatment depositing device are configured to release drops of the treatment substance, and wherein the controlling is performed to ensure that the drop of the treatment substance and the seed and/or plantable material subsequently or simultaneously arrive at or in one of the planting positions.

9. A system for treatment and seeding or planting of seeds and/or plantable material in a substrate in the form of a tray made from fibrous material having transversal rows of planting positions at well defined intermediate distances in a direction of relative displacement, said transversal rows of planting positions each having a transversal orientation relative to the direction of relative displacement, the device comprising:

(a) a stationarily arranged treatment depositing device relative to a stationary ground configured to treat the seeds and/or the plantable material with a treatment substance by depositing the treatment substance in or at the planting positions, wherein the treatment substance is liquid;

(b) a stationarily arranged seed and/or plantable material depositing device relative to a stationary ground configured to deposit the seeds and/or the plantable material at the planting positions, wherein the seed and/or plantable material depositing device and the treatment depositing device each comprise a row of depositing elements, said row having a transversal orientation relative to the direction of relative displacement, wherein the row of depositing elements of the seed and/or plantable material depositing device and the row of depositing elements of the treatment depositing device are each configured for depositing the seeds and/or plantable material and said treatment substance, respectively, in a corresponding transversal row of planting positions, and the depositing elements of the treatment depositing device and the depositing elements of the seed and/or plantable material depositing device are at a distance from one another in said direction of relative displacement;

(c) a transport device configured for continuous movement of the substrate in the direction of relative displacement essentially without interruptions; and (d) a control for the treatment depositing device and the seed and/or plantable material depositing device such that at least one specimen of the seeds and/or the plantable material and a desired amount of treatment substance are deposited at the planting positions on the basis of the relative distance between the depositing elements of the treatment depositing device and the depositing elements of the seed and/or plantable material depositing device a speed of movement of the substrate, wherein the planting positions are in the shape of depressions or pits.

10. The system of claim 9 wherein the treatment substance is chosen from the group consisting of: a fungicide, a pesticide, a plant growth promoting substance, and a bacteria.

11. The system of claim 9, wherein the seeds and/or the plantable material is chosen from the group consisting of seeds and seedlings.

12. The system of claim 9, comprising a control configured to drive the seed depositing elements and treatment depositing elements to subsequently or simultaneously deposit a number of seeds and/or plantable material and a desired amount of treatment substance in correspondence with the number of planting positions in each of the rows.

13. The system of claim 9, wherein the depositing elements of the treatment depositing device and seed and/or plantable material depositing device are each configured for depositing a seed and/or plantable material or treatment substance at a single respective planting position at a time.

14. The system of claim 9, wherein the fibrous material is stone wool fibers, pot soil or cocos fibers.

15. The method system according to claim 9, wherein the treatment substance is chosen from the group consisting of: a fungicide and a pesticide.

16. The system according to claim 9, wherein the depositing elements of the treatment depositing device are configured to release drops of the treatment substance, and wherein the controlling is performed to ensure that the drop of the treatment substance and the seed and/or plantable material subsequently or simultaneously arrive at or in one of the planting positions.

17. A method of treatment and seeding or planting of seeds and/or plantable material, comprising in any order:

(a) providing a substrate in the form of a tray made from fibrous material having transversal rows of planting positions at well defined intermediate distances in a direction of relative displacement, said transversal rows of planting positions each having a transversal orientation relative to the direction of relative displacement, said planting positions being in the shape of depressions or pits;

(b) treating the seeds and/or plantable material with a treatment substance by depositing the treatment substance in or at the planting positions with the aid of a treatment depositing device, wherein the treatment substance is liquid;

(c) depositing the seeds and/or plantable material at the planting positions with the aid of a seed and/or plantable material depositing device, wherein the treatment depositing device and the seed and/or plantable material depositing device are arranged in a stationary manner relative to a stationary ground, wherein the seed and/or plantable material depositing device and the treatment depositing device each comprise a row of depositing elements, said row having a transversal orientation relative to the direction of relative displacement, wherein the row of depositing elements of the seed and/or plantable material depositing device and the row of depositing elements of the treatm e are each configured for depositing the seeds and/or plantable material and said treatment substance, respectively, in a corresponding traversal row of planting positions, said depositing elements of the treatment depositing device and said depositing elements of the seed and/or plantable material depositing device being at a distance from one another in said direction of relative displacement;

(d) displacing the substrate in said direction of relative displacement; and (e) controlling the treatment depositing device and the seed and/or plantable material depositing device such that at least one specimen of the seeds and/or plantable material and a desired amount of treatment substance are deposited at the planting positions on the basis of said relative distance between the depositing elements of the treatment depositing device and the depositing elements of the seed and/or plantable material depositing device and the speed of movement of the substrate, wherein the depositing elements of the treatment depositing device and the seed and/or plantable material depositing device each deposit a seed and/or plantable material or treatment substance at a single respective planting position at a time.

18. A system for treatment and seeding or planting of seeds and/or plantable material in a substrate in the form of a tray made from fibrous material having transversal rows of planting positions at well-defined intermediate distances in a direction of relative displacement, said transversal rows of planting positions each having a transversal orientation relative to the direction of relative displacement, said planting positions being in the shape of depressions or pits, comprising:

(a) a treatment depositing device configured to treat the seeds and/or plantable material with a treatment substance by depositing the treatment substance in or at the planting positions, wherein the treatment substance is liquid;

(b) a seed and/or plantable material depositing device configured to deposit the seeds and/or plantable material at planting positions, wherein the treatment depositing device and the seed and/or plantable material depositing device are arranged in a stationary manner relative to a stationary ground, wherein the seed and/or plantable material depositing device and the treatment depositing device each comprise a row of depositing elements, said row having a transversal orientation relative to the direction of relative displacement, wherein the row of depositing elements of the seed and/or plantable material depositing device and the row of depositing elements of the treatment depositing device are each configured for depositing the seeds and/or plantable material and said treatment substance, respectively, in a corresponding transversal row of planting positions, said depositing elements of the treatment depositing device and said depositing elements of the seed depositing device being at a distance from one another in said direction of relative displacement; and (c) a transport device configured for movement of the substrate in said direction of relative displacement;

(d) the system further comprising a control for the treatment depositing device and the seed and/or plantable material depositing device such that at least one specimen of the seeds and/or plantable material and a desired amount of treatment substance are deposited at the planting positions on the basis of said relative distance between the depositing elements of the treatment depositing device and the depositing elements of the seed and/or plantable material depositing device and the speed of movement of the substrate, wherein the depositing elements of the treatment depositing device and the seed and/or plantable material depositing device are each configured for depositing a seed and/or plantable material or treatment substance at a single respective planting position at a time.

\* \* \* \* \*

UNITED STATES PATENT AND TRADEMARK OFFICE
CERTIFICATE OF CORRECTION

PATENT NO.        : 8,938,910 B2
APPLICATION NO.   : 11/918771
DATED             : January 27, 2015
INVENTOR(S)       : Mulder It is certified that error appears in the above-identified patent and that said Letters Patent is hereby corrected as shown below:

In the Claims

Claim 15, col. 6, line 37, after "The" and before "system" please delete "method".

Claim 17, col. 7, line 7, after "of the" and before "are each" please replace "treatm e" with --treatment depositing device--.

Signed and Sealed this
Fifth Day of May, 2015

Michelle K. Lee
*Director of the United States Patent and Trademark Office*